(12) United States Patent
Perentes et al.

(10) Patent No.: US 9,248,956 B2
(45) Date of Patent: Feb. 2, 2016

(54) CAPSULE FOR THE PREPARATION OF A BEVERAGE BY CENTRIFUGATION

(71) Applicant: Nestec S.A., Vevey (CH)

(72) Inventors: Alexandre Perentes, Lausanne (CH); Alfred Yoakim, St-Legier-la Chiesaz (CH)

(73) Assignee: Nestec S. A., Vevey (CH)

( * ) Notice: Subject to any disclaimer, the term of this patent is extended or adjusted under 35 U.S.C. 154(b) by 0 days.

(21) Appl. No.: 14/394,710

(22) PCT Filed: Apr. 23, 2013

(86) PCT No.: PCT/EP2013/058331
§ 371 (c)(1),
(2) Date: Oct. 15, 2014

(87) PCT Pub. No.: WO2013/160268
PCT Pub. Date: Oct. 31, 2013

(65) Prior Publication Data
US 2015/0132445 A1    May 14, 2015

(30) Foreign Application Priority Data
Apr. 25, 2012  (EP) .................................... 12165443

(51) Int. Cl.
*B65D 85/804* (2006.01)
*A47J 31/22* (2006.01)

(52) U.S. Cl.
CPC ............ *B65D 85/8043* (2013.01); *A47J 31/22* (2013.01)

(58) Field of Classification Search
CPC .......................... B65D 85/8043; B65D 85/804
USPC ................ 426/77, 78, 79, 80, 81, 82, 83, 84; 99/302 C, 295
See application file for complete search history.

(56) References Cited

U.S. PATENT DOCUMENTS

2005/0266122 A1*  12/2005  Franceschi ...................... 426/77
2010/0178404 A1*  7/2010   Yoakim et al. ................. 426/431
2011/0151075 A1   6/2011   Peterson

FOREIGN PATENT DOCUMENTS

WO   2008148650 A1   12/2008
WO   2011023711 A1   3/2011

OTHER PUBLICATIONS

International Search Report, mailed May 23, 2013 in PCT/EP13/058331, filed Apr. 23, 2013.
Written Opinion of the International Search Report, mailed May 23, 2013 in PCT/EP13/058/331, filed Apr. 23, 2013.

* cited by examiner

*Primary Examiner* — Rena L Dye
*Assistant Examiner* — Ericson M Lachica
(74) *Attorney, Agent, or Firm* — Dunlap Codding, P.C.

(57) ABSTRACT

Capsule (1) for the preparation of a beverage by centrifugation in a beverage preparation device; the capsule comprising: a generally concave outer wall (2) and a generally concave inner wall (3); each wall having a peripheral portion (4, 5) extending substantially revolutionary around a central axis (I) and a bottom portion (6, 7); a lid (18) extending transversally to said central axis (I) and covering said outer and inner walls (2, 3); and forming with said inner wall an inner cavity (8) containing beverage ingredients (9), an outer cavity (10) positioned between the inner and outer walls (2, 3).

17 Claims, 11 Drawing Sheets

CAPSULE FOR THE PREPARATION OF A BEVERAGE BY CENTRIFUGATION

FIELD

The presently disclosed and/or claimed inventive concept(s) relates to a capsule, containing beverage ingredients, for preparing a beverage in a beverage preparation device using the forces of centrifugation.

BACKGROUND

Capsules containing beverage ingredients and designed for producing a beverage in a beverage preparation device by supplying liquid in the capsule and by extracting the beverage using the centrifugal forces are known.

The principle consists in preparing a beverage by forcing a liquid (usually water) through the beverage ingredients contained in the capsule using the centrifugal forces obtained when the capsule is rotated in the device at elevated speed. Usually liquid is supplied in the centre of the capsule. The rotation of the capsule in the device creates a centrifugal pressure gradient in the capsule that forces liquid through the ingredients. The beverage is expelled at the periphery of the capsule and usually collected by a collecting assembly of the device.

A capsule for preparing a beverage and a system using centrifugal forces is for example described in WO2008/148650. The single-use capsule comprises: an enclosure containing a predetermined amount of food substance, a plurality of outlet openings of the enclosure for enabling the food liquid to leave the enclosure under the centrifugal forces exerted in the capsule during centrifugation, said outlet openings being arranged at a peripheral portion of wall of the enclosure.

The capsule according to the prior art suffers the drawback that it requires a collecting assembly of the beverage preparation device to collect the centrifuged beverage and guide it properly to the recipient (e.g., cup or mug). Therefore, the beverage necessarily contacts the device which becomes contaminated by food contact. This requires the device to be frequently rinsed. Also, the taste of the beverage can be affected by effect of cross-contamination of a beverage dispensed before. Furthermore, the collecting assembly makes the device more cumbersome as it usually surrounds the capsule entirely.

DETAILED DESCRIPTION OF THE FIGURES

Figure 1:
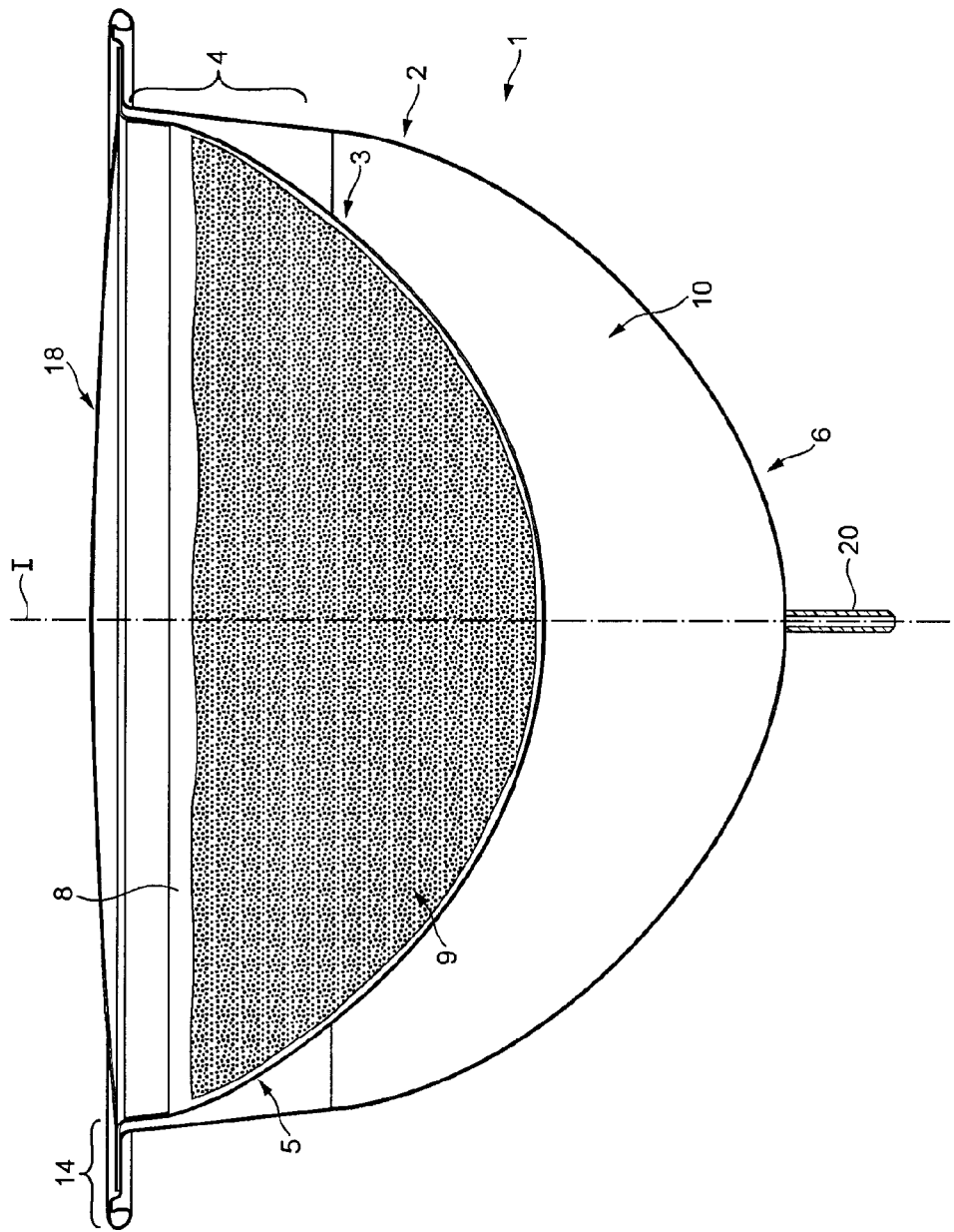
FIG. 1 is a cross-sectional view of a capsule with ingredients contained therein according to the presently disclosed and/or claimed inventive concept(s)

The presently disclosed and/or claimed inventive concept(s) alleviates the prior art problems mentioned above by providing a capsule suitable for use in a centrifugal beverage preparation device without the need for an external collecting assembly of the device. As a result, the problems linked to the food contamination can be solved. The design of the device can be greatly simplified.

In certain embodiments, the presently disclosed and/or claimed inventive concept(s) relates to a capsule for the preparation of a beverage by centrifugation in a beverage preparation device. The capsule includes a generally concave outer wall and a generally concave inner wall, wherein each wall has a peripheral portion extending substantially revolutionary around a central axis (I) and a bottom portion. The capsule also includes a lid extending transversally to said central axis (I) and covering said outer and inner walls, and forming with said inner wall an inner cavity containing beverage ingredients. The capsule further includes an outer cavity positioned between the inner and outer walls, The beverage outlets or outlet precursors are positioned on the peripheral portion of the inner wall to enable the beverage to be displaced from the inner cavity to the outer cavity under the effect of centrifugal pressure; the outer cavity thereby collects the beverage coming from the inner cavity.

In certain particular, non-limiting embodiments, the bottom portion of the outer wall comprises a beverage outlet enabling the beverage to leave the capsule. The outlet may be open, forming communication for liquid between the outer cavity and the external environment. Alternatively, the outlet may comprise a closing means, such as but not limited to, a peelable membrane which, after removal, provides communication for liquid between the outer cavity and the external environment.

In certain particular, non-limiting embodiments, the beverage outlet is aligned with the central axis of the capsule. The position of the outlet enables delivery of a beverage under the lowest possible pressure, thereby greatly diminishing the effect of liquid dispersion due to the centrifugal forces exerted in the capsule. In particular, the beverage outlet may have a larger transversal dimension of less than 5 mm, such as, but not limited to, less than 3.5 mm or between 0.5 and 3.5 mm.

Other embodiments of the presently disclosed and/or claimed inventive concept(s) relates to the use of a capsule as aforementioned for preparing a beverage in a centrifugal beverage preparation device.

The appended drawings are given as a matter of non-exhaustive illustration of the certain embodiments of the presently disclosed and/or claimed inventive concept(s) and are not to be regarding as limiting.

The presently disclosed and/or claimed inventive concept(s) relates to a capsule for the preparation of a beverage designed for being used in a centrifugal beverage preparation device, such device driving the capsule in rotation at a sufficient rotational speed or speed range to force a liquid supplied in the centre line of the capsule to traverse the beverage ingredients by the effect of the centrifugal forces created on the liquid. The capsule is given a particular design which enables the capsule to collect and dispense the centrifuged beverage without contacting parts of the device itself.

Figure 2:
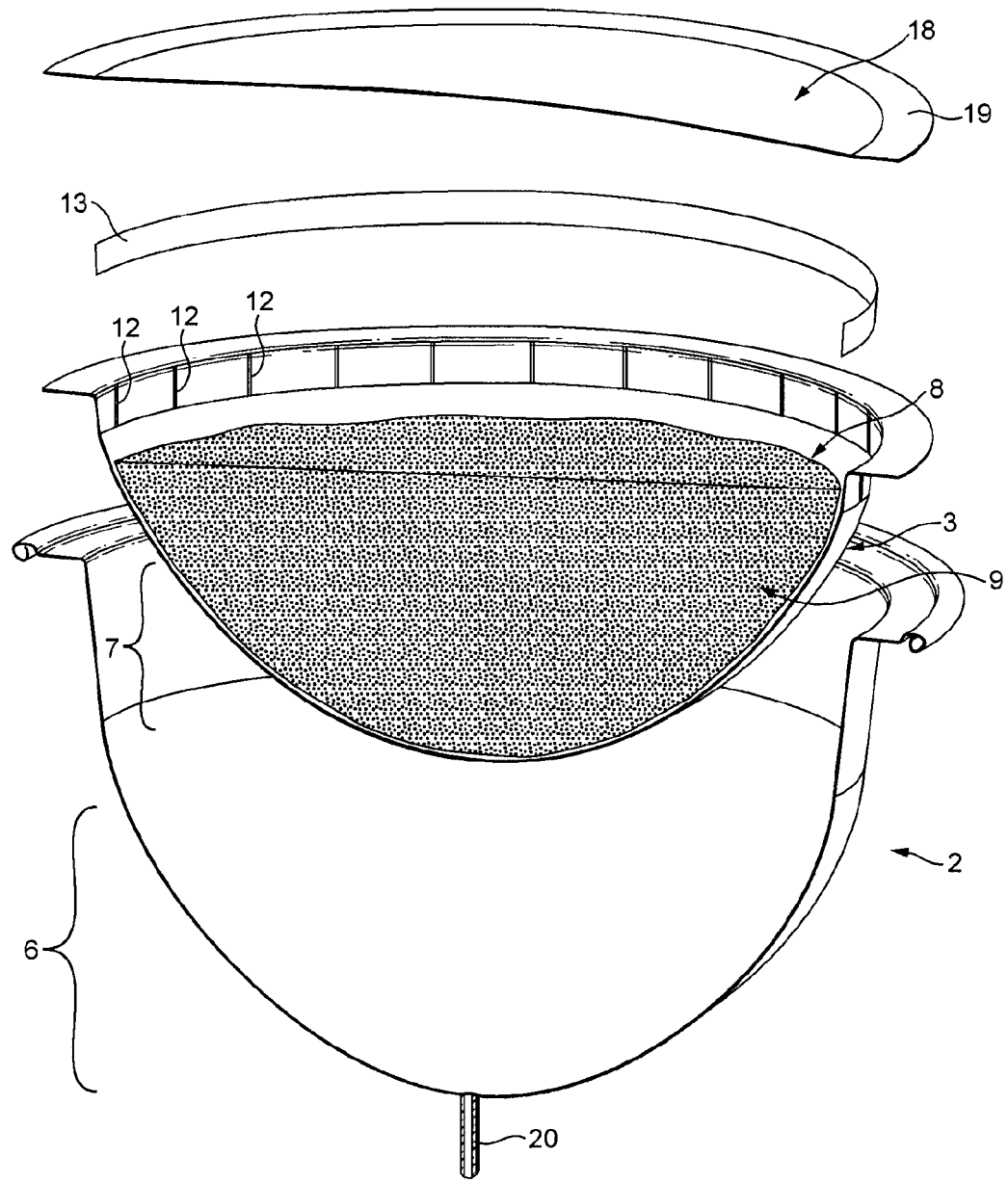
FIG. 2 is a cross-sectional view and exploded view of a capsule according to claim 1.
Figure 3:
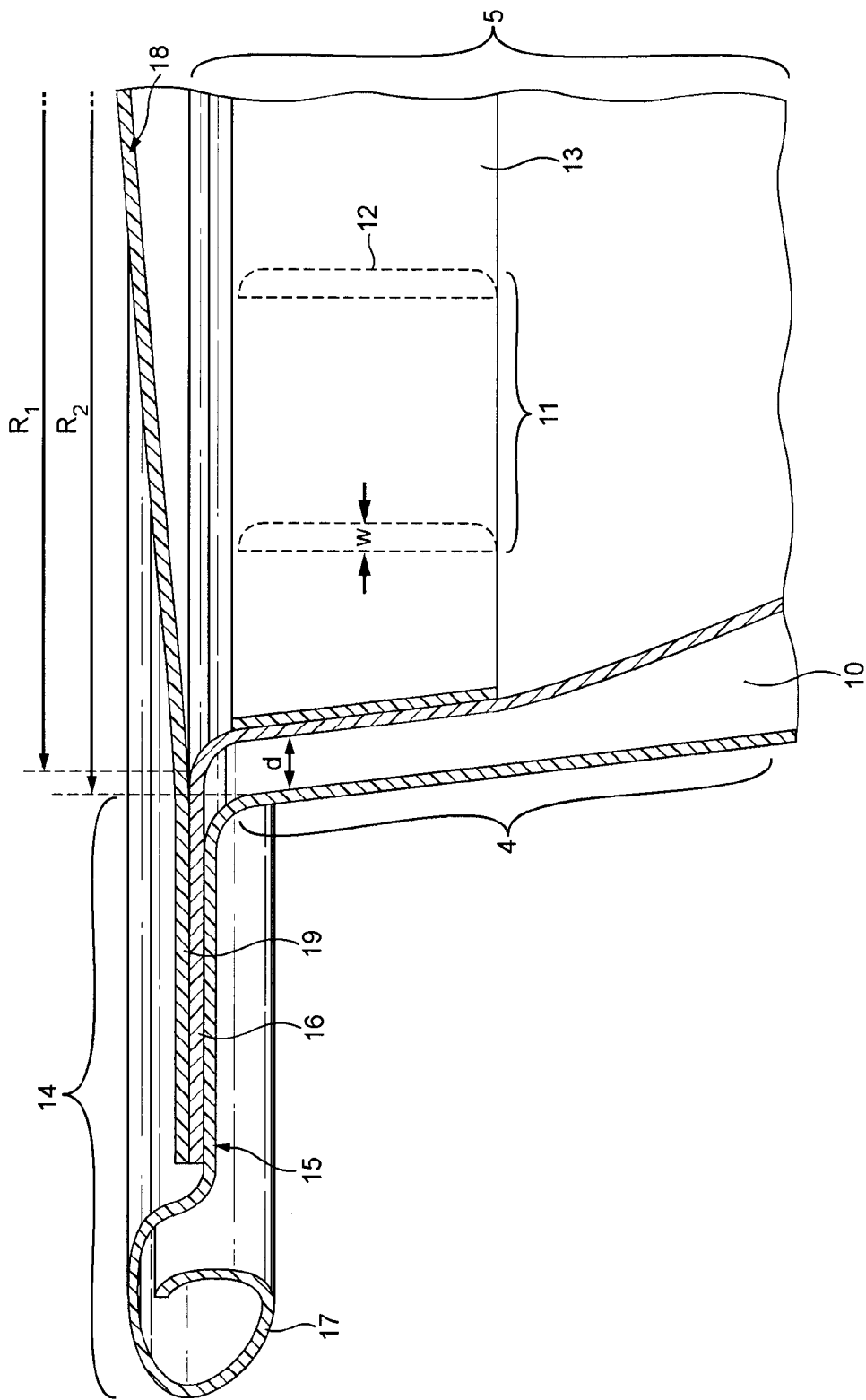
FIG. 3 is a detailed view of the capsule of FIGS. 1 and 2.
Figure 4:
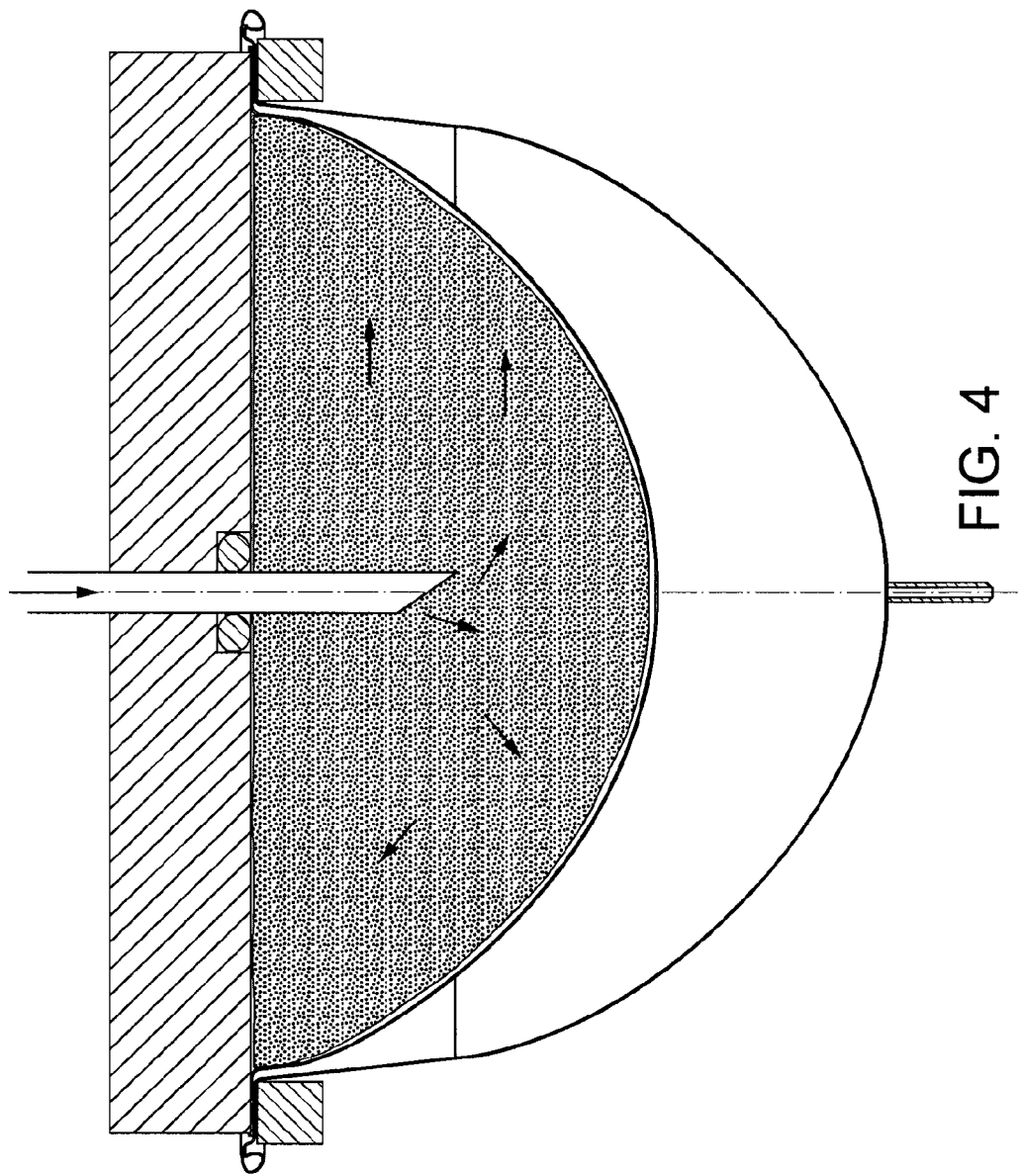
FIG. 4 shows a capsule according to FIGS. 1 to 3 in a beverage preparation device during the pre-wetting operation of the ingredients contained in the capsule.
Figure 5:
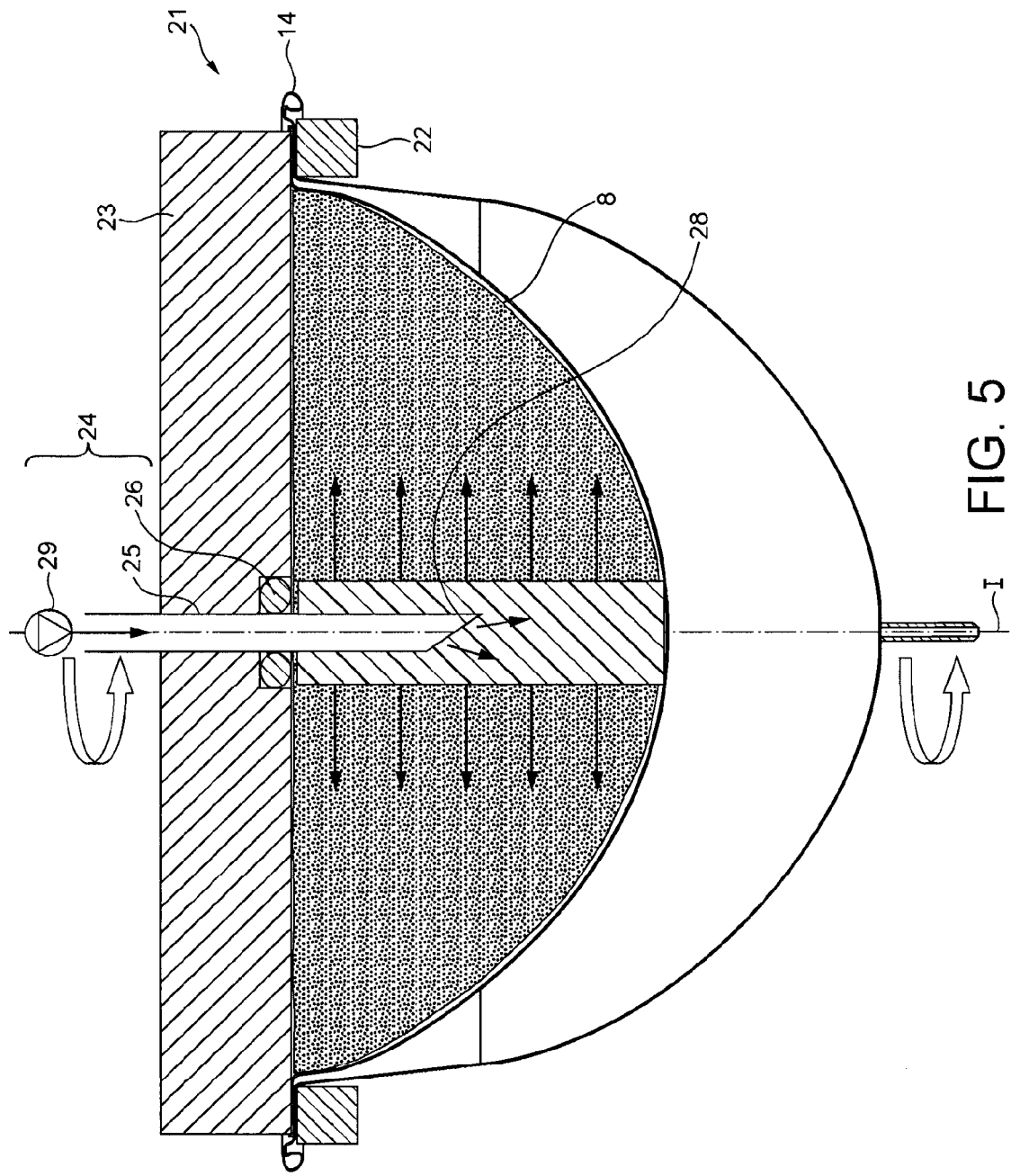
FIG. 5 shows the capsule according to FIGS. 1 to 3 in a beverage preparation device when a gradient of pressure builds up at the beginning of the centrifugation.
Figure 6:
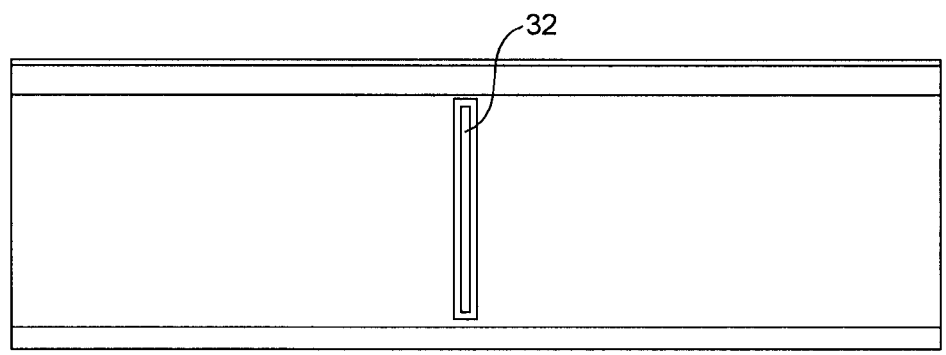
FIG. 6 is a detailed view showing the outlets being formed from the outlet precursors by the effect of the centrifugal forces acting at the beginning of the centrifugation.

In FIGS. 1 to 3, a first mode of the capsule is illustrated. The capsule 1 comprises an outer wall 2 and an inner wall 3. The two walls 2, 3 are generally concave when viewed from the interior of the capsule. The outer wall 2 has a peripheral portion 4 and the inner wall also presents a peripheral portion 5. The two peripheral portions are preferably distant one another, for example, from 0.5 to 10 mm. Both peripheral portions 4, 5 extend substantially revolutionary around a central axis "I". It should be noted that FIG. 2 shows in cross-section only half of the capsule; the other half being removed for the comprehensiveness. The outer wall 2 extends downwardly by a bottom portion 6. The inner wall as well extends downwardly by a bottom portion 7. As a result, a cavity 8 is formed by the inner wall which contains beverage ingredients 9. In other terms, the inner wall forms a cup-shaped member which is inserted in the outer wall which is formed of a comparatively larger cup-shaped member. As a result of this configuration, an outer collecting cavity 10 is left between the two walls. In certain particular, non-limiting embodiments, the collecting cavity extends from the peripheral portions to the bottom walls.

In this first mode, the inner wall comprises outlet precursors 11 which are positioned on the peripheral portion 5 of the inner wall facing the peripheral portion 4 of the outer wall (FIG. 3). The outlet precursors form means enabling to create beverage outlets through the inner wall as a result of the centrifugal pressure exerted on the peripheral portion of the inner wall. In certain particular, non-limiting embodiments, the outlet precursors are preferably revolutionarily distributed on the inner wall around axis I. For example, but not by way of limitation, they may be positioned at or in the vicinity of the largest radius. Therefore, due to the largest radius of the inner wall, the centrifugal pressure of liquid is the highest as well enabling the outlets to be created as a result of such pressure. The outlet precursors can be formed by series of premade openings 12 provided in the inner wall and covered by a tearable membrane 13. The membrane 13 may be constituted as a single annular band, as illustrated, which is affixed to the inner wall. The membrane can be partially or fully fixed to the inner wall. Of course, the membrane can be formed by two or more pieces of bands. For example, the membrane can be fixed to the inner wall by an adhesive, by lamination and/or by a sealing technique such as heat or ultrasonic sealing. The band can be fixed to the interior of the inner wall. The structure of the outlet precursors can differ from the illustrated structure. For example, the outlet precursors can be formed of a plurality of pre-weakened or precut areas provided in the inner wall. A pre-weakened area is typically an area in which the thickness of the inner wall is reduced such as along a line or a conjunction of lines thereby enabling a rupture of the area along these line(s) when a pressure of liquid is applied thereon. A precut area refers to an area of the inner wall in which the full thickness of the wall is cut, continuously or discontinuously, to form upon the effect of liquid under pressure, a larger opening such as by deformation, extension, rupture, tearing, or other physical opening conditions implying force or pressure of liquid on the area.

The premade openings 12 can be circular or elongated. Elongated openings may be slits formed in the inner wall, for example, slits oriented substantially parallel to the central axis I. The premade openings 12 in the inner wall may have a diameter or a smaller cross-sectional dimension that is lower than 500 microns, such as, but not limited to, lower than 400 microns or lower than 300 microns. The smaller cross-sectional dimension refers to the dimension of a non-circular opening such as the width "w" of an elongated slit provided in the inner wall. This critical dimension (i.e., diameter or width) is typically determined in such a manner to be smaller than the average particle size of the beverage ingredients. The particle size can be expressed in volumetric mean diameter $D_{4,3}$ as known per se. In particular, non-limiting embodiments, the beverage ingredients are roast and ground coffee particles which may have a particle size comprised between 650 and 180 microns. Usually, larger particle sizes, such as between 450 and 650 microns are generally selected for producing a filter-type or other long-type coffee, whereas smaller particle sizes, such as between 180 and 350 microns are generally selected for producing a espresso-type, ristretto or other short-type coffee.

As shown in particular in FIG. 3, a peripheral flange 14 is provided on the capsule. The flange extends outwardly from outer wall, i.e., in a radial direction transverse to the central axis I. The flange may not extend necessarily strictly perpendicular to the axis I but may form a slight angle either downwardly or upwardly. The flange is formed at least partially by an outwardly extending edge 15 of the outer wall. Furthermore, the flange comprises an outwardly extending edge 16 of the inner wall. The edge 16 can be sealed onto the edge 15 of the outer wall. In certain particular, non-limiting embodiments, the inner radius "$R_1$" of the edge 16 of the inner wall (to the axis I) of the inner wall is smaller than the inner radius "$R_2$" of the edge 15 of the outer wall. As a result, the edge 16 of the inner wall has an unsealed portion which extends inwardly to enable maintain a certain distance "d" between the peripheral portions of the inner and outer walls. Furthermore, the outer radius of the edge 15 of the outer wall (to the axis I) is larger than the outer radius of the edge 16 of the inner wall. The free end of the flange may be provided with a curled portion 17.

A lid 18 is further provided for at least partially closing the outer and inner walls of the capsule. The lid forms a wall transversally oriented to the axis I. The lid comprises a transversal peripheral portion 19 which is sealed on the flange 14. As particularly shown in FIG. 3, the lid is sealed on the edge 16 of the inner wall. The lid could also be sealed further outwardly on the edge of the outer wall. The lid may be formed of a perforable membrane. Such membrane can made of liquid tight material. For example, but not by way of limitation, the liquid tight material may be made of packaging material that provides gas barrier properties and also particularly light barrier properties. The outer wall of the capsule may as well be constituted of packaging material(s) that provide gas barrier properties and also particularly light barrier properties. As a result, the membrane before perforation, in particular, non-limiting embodiments, the entire capsule is gastight. Furthermore, the internal gas volume of the capsule is filled with gas containing low amount of oxygen or substantially no oxygen. The freshness of the content in the capsule is therefore greatly improved, notably when such content is sensitive to oxygen such as ground coffee. A gastight membrane can be made of aluminium, plastic laminate containing EVOH, laminate of paper and EVOH or combinations thereof. In an alternative, the lid is formed of a wall which has a central aperture for enabling the liquid supplying means of the beverage preparation device to be inserted through the lid. For example, the lid can be a semi-rigid or rigid plastic wall such as made of PP or PE plastic. As apparent in the figures, the lid of the capsule may form a slight bulged (convex) profile due to the internal pressure of gas (e.g., $CO_2$ and/or Nitrogen) contained in the inner cavity.

The bottom portion of the outer wall 2 furthermore comprises a beverage outlet 20 enabling the beverage to leave the capsule as will be explained later on. In particular, non-limiting embodiments, beverage outlet is positioned in alignment with the central axis I. The positioning of the outlet enables the delivery of the beverage at the lowest possible centrifugal pressure in the capsule. This positioning favours the emptying of the capsule and reduces the velocity of the flow coming out of the capsule.

FIGS. 5 to 8 illustrate a particular, non-limiting method for preparing a beverage from a capsule of the invention. The capsule is provided in a beverage preparation device comprising capsule holding means 21. The capsule holding means may comprise a lower ring-shaped support 22 for holding the flange 14 of the capsule and an upper ring-shaped support 23 for pressing the flange 14 against the lower ring-shaped support 22. The flange is thereby sufficiently pinched between the two supports for allowing the capsule to be driven in rotation along axis "I" while resisting to the torque, related to the weight and mass distribution of the capsule, applied during the next centrifugal operation. The device further comprises liquid supply means 24 for supplying liquid in the capsule through the lid. For this, the liquid supply means 24 comprises a liquid injector 25 connected upstream to a pump 29 and a liquid reservoir (not shown), for example, a hollow needle, and a sealing member 26 such as an 0-ring placed at the junction between the injector and the contact surface 27 of the support 23. In particular, non-limiting embodiments, the device is designed to leave the bottom portion 4 of the outer wall uncovered, in particular, its beverage outlet 20. The liquid injector perforates the lid 18 when the holding means are in engagement with the capsule. The hollow tip 28 of the injector is therefore positioned along the centre line "I" of the capsule and particularly may be engaged in between ¼ and ¾ of the central depth of the cavity. This enables to dispense liquid in the centre of the mass of ingredients in a relatively homogeneous manner.

The holding means 21 are arranged in the device to be driven in rotation about the central axis "I". In general the holding means are mounted to a frame on bearings and are driven by a rotational motor (not shown). The injector may also be driven in rotation with the holding means or be static with the frame.

In a first step (FIG. 5), liquid is supplied in the inner cavity 8 of the capsule containing the beverage ingredients. In particular, non-limiting embodiments, liquid is supplied until a positive pressure of liquid is reached in the cavity. The pressure may, for instance, be of between 0.3 and 1 bar. For coffee, such pre-wetting time may be beneficial for the quality of the beverage. Therefore, this step may be operated between 1 to 10 seconds, for instance.

Figure 7:
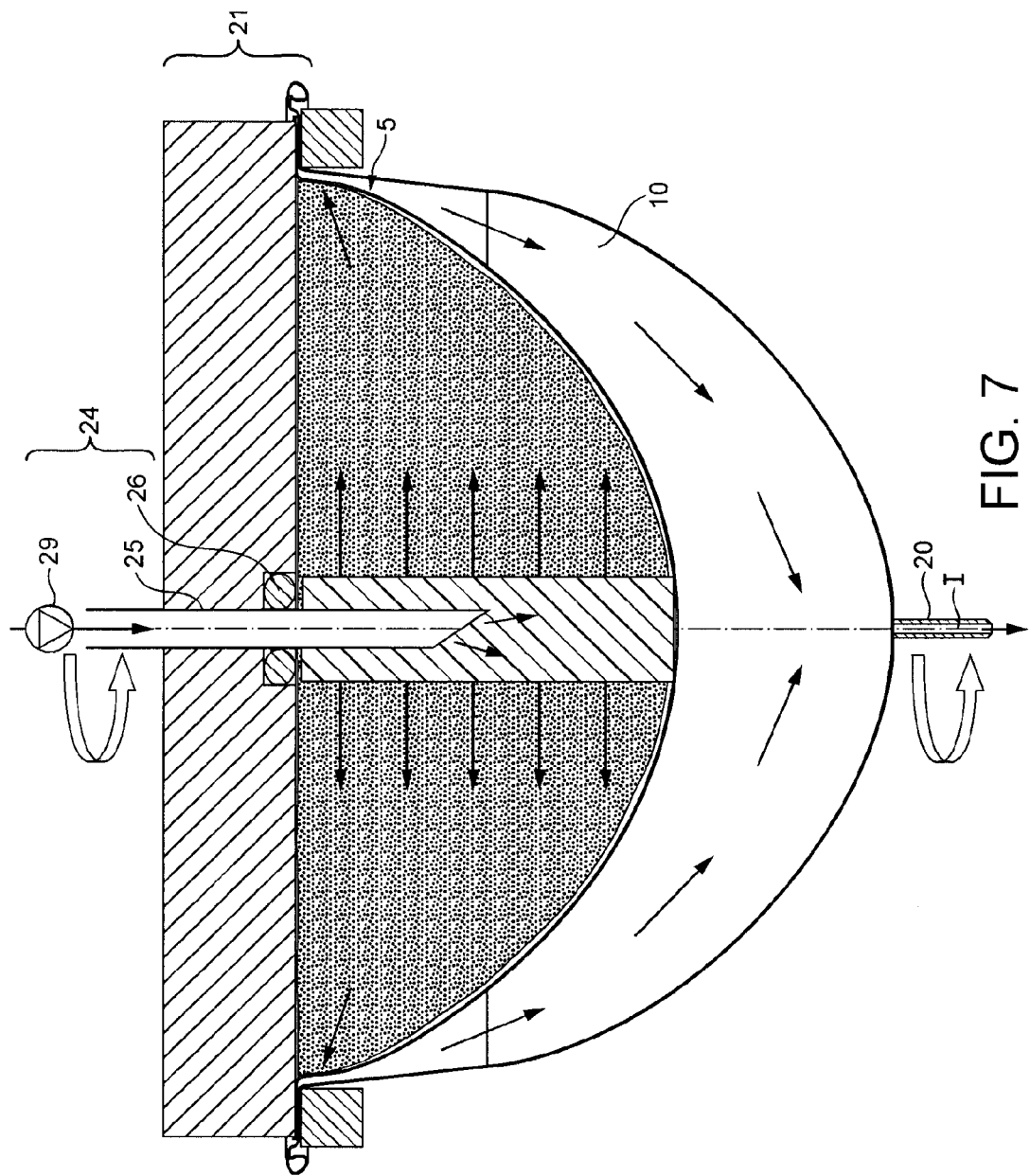
FIG. 7 shows the capsule according to FIGS. 1 to 3 in a beverage preparation device during the centrifugation when beverage is drained out the capsule.

In the next step, the capsule starts being rotated by the holding means in the device. During the rotation of the capsule, the liquid supply means carry on supplying liquid in the capsule. The capsule is rotated at elevated rotational speed around axis "I" to force liquid through the beverage ingredients in centrifugal (substantially radial) direction as shown in FIG. 7. The rotational speed can be comprised between 500 and 10000 rpm, such as, but not limited to, between 1000 and 7000 rpm. A gradient of pressure builds up in the capsule that progressively increases from the central axis "I" towards the peripheral portion 5 of the inner wall. The pressure at the central axis is function of the liquid pressure built by pump 29 in the device. Preferably, such pressure is a positive pressure in the range of several millibar to several hundreds of millibar.

In particular, non-limiting embodiments, the pressure of supplied liquid in the axis I is of at least 300 mbar, such as, but not limited to, comprised between 300 mbar and 1 bar, or between 300 and 600 mbar. The pressure of liquid is the one that can be measured with a pressure gauge installed at the liquid injector just upstream of the capsule. The gradient of pressure starting from such central pressure and progressively increasing towards the periphery of the cavity is function of the radius in the cavity (from axis I to the inner wall) and the rotational speed in the capsule. Therefore, the speed is controlled by the device to ensure that the pressure of liquid becomes sufficient to create outlets from the outlet precursors. In particular, the outlets 32 are formed by a tearing of the membrane 13 at the location of the openings 12 under the effect of the centrifugal pressure in this location. For example, the pressure may reach a value or values between one to several bars in the peripheral portion of the inner wall. As outlets are created in the inner wall, the liquid or beverage flows through the inner wall to the collecting cavity 10. As a positive pressure of supplied liquid is maintained in the cavity 8, beverage accumulates progressively in the collecting cavity 10 and finally when the collecting cavity is sufficiently filled with beverage and still a positive pressure is present in the centre of the cavity, beverage drains out through the beverage outlet 20.

Beverage is poured directly into a receptacle such as a cup or mug placed beneath the outlet 20. In particular, non-limiting embodiments, the outlet extends by a duct of relatively small diameter to reduce the velocity of the dispensed liquid coming out of the capsule. In other particular, non-limiting embodiments (and/or in addition thereto), the diameter of the outlet is smaller than 5 mm, such as, but not limited to, a diameter between 0.5 to 3.5 mm. The duct may also extend beyond the bottom portion of the outer wall a distance of between 0.5 to 10 mm.

Figure 8:
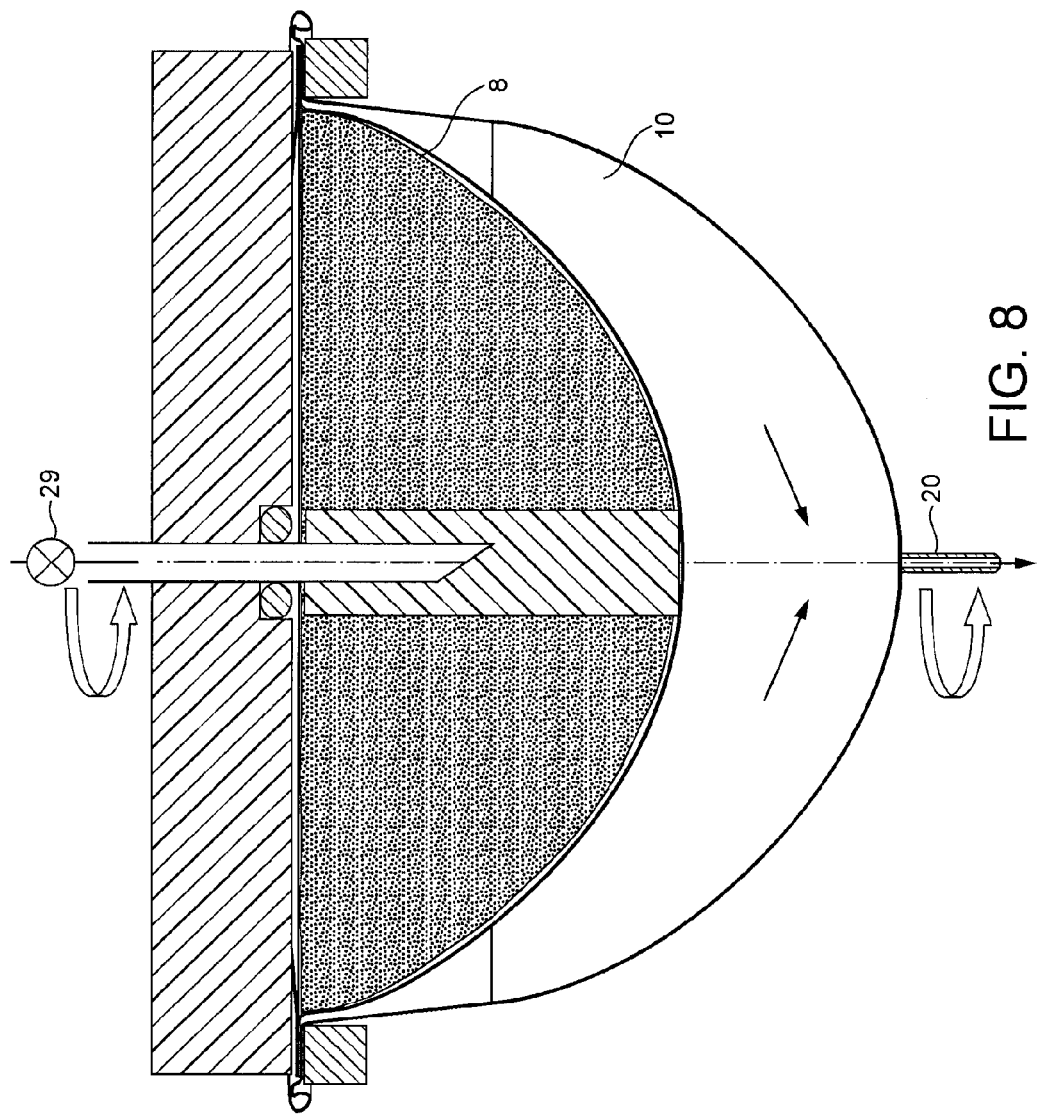
FIG. 8 shows the capsule according to FIGS. 1 to 3 in a beverage preparation device in the final step of the centrifugation causing the emptying of the capsule.

At the end of the beverage dispensing, as shown in FIG. 8, the supply of liquid may be stopped such as by stopping the pump 29 or closing a valve in the liquid supply line. Consequently, the pressure in the inner cavity 8 of the capsule drops. The residual liquid contained in the inner cavity 8 can thus be transferred to the collecting cavity 10 by maintaining the rotation of the capsule at an elevated rotational speed, e.g., 500 to 10000 rpm. The centrifugation can be maintained until the mass of depleted ingredients (ground coffee) has substantially dried. The rotation is then stopped and the residual liquid is drained through the beverage outlet 20. Therefore, the capsule is emptied from liquid by controlling the supply of liquid in the capsule and the centrifugation of the capsule so that all liquid is moved to the collecting cavity and then drained through the capsule without contacting the device.

A wide range of beverage volume, such as of between 25 to 250 ml, can be delivered depending on the volume of supplied liquid in the capsule. For example, a small coffee of between 25 ml to 40 ml can be dispensed with a weight of about 4 to 7 grams of roast and ground coffee. A larger coffee of between 100 to 250 ml can be dispensed with a weight of about 7 to 15 grams of roast and ground coffee. The rotational speeds can be controlled as a function of the type of beverage to be extracted from the capsule. For example, a large coffee volume may require to be dispensed at higher flow rate to prevent an over-extracted taste, thereby requiring a higher rotational speed to be controlled by the device. The rotational speed may also be varied during the preparation of the beverage. In particular, the rotational speed may be increased to a higher value for obtaining the perforation of the membrane (i.e., opening the outlets) and then be reduced during the beverage extraction through the beverage outlet.

Of course, the invention can be contemplated without a perforable membrane 13. For instance, the inner wall may already be opened at its peripheral portion by a series of openings. The outlet precursors could also be envisaged differently.

Figure 9:
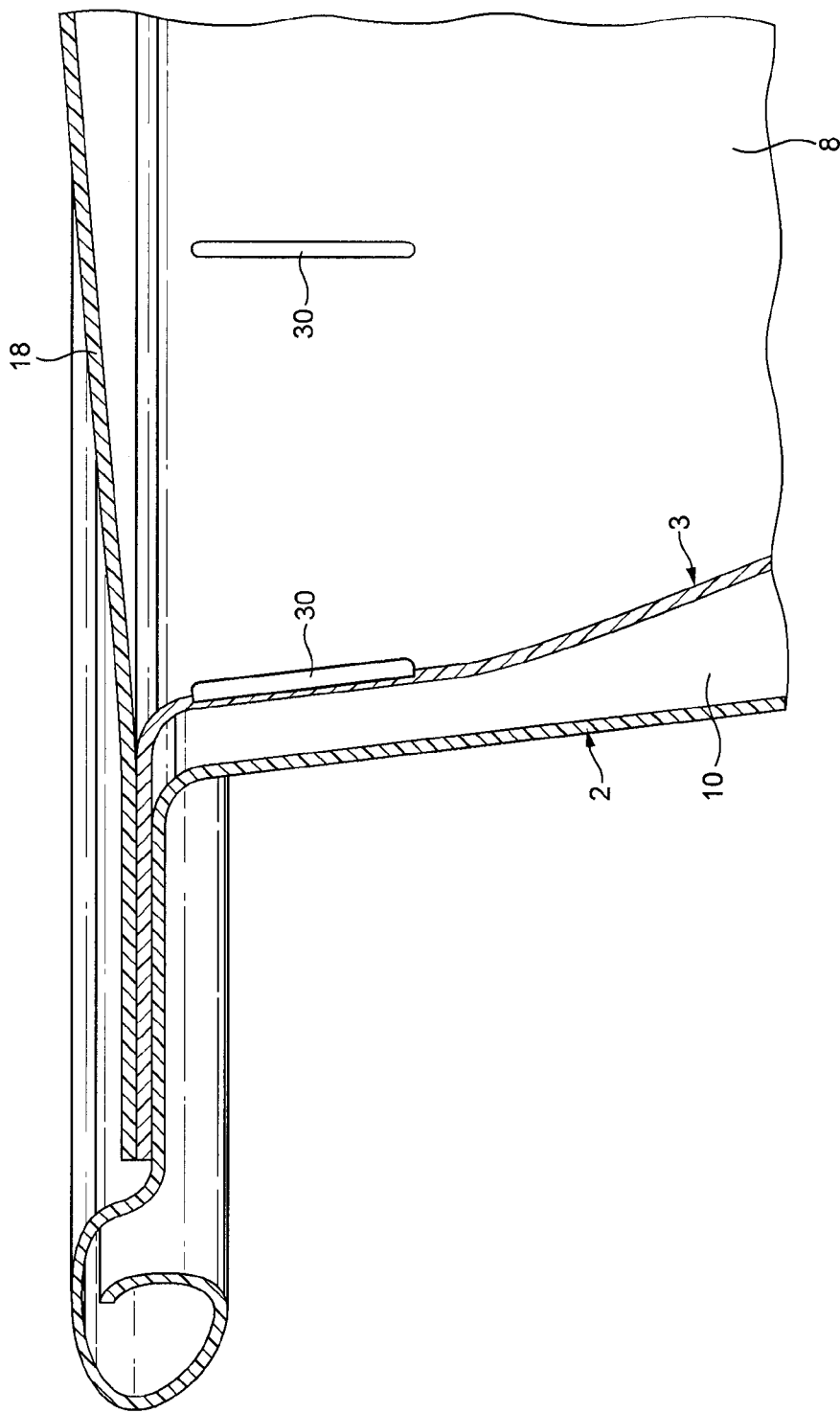
FIG. 9 is a detailed view of the capsule of FIGS. 1 and 2 according to a first variant.

For example, FIG. 9 illustrates a mode in which the outlet precursors 11 are formed by pre-weakened areas 30 in the inner wall 3. Each pre-weakened area is obtained by a localized reduction of the thickness of the inner wall. Such reduction of thickness can be given the shape of a slot or other form.

Figure 10:
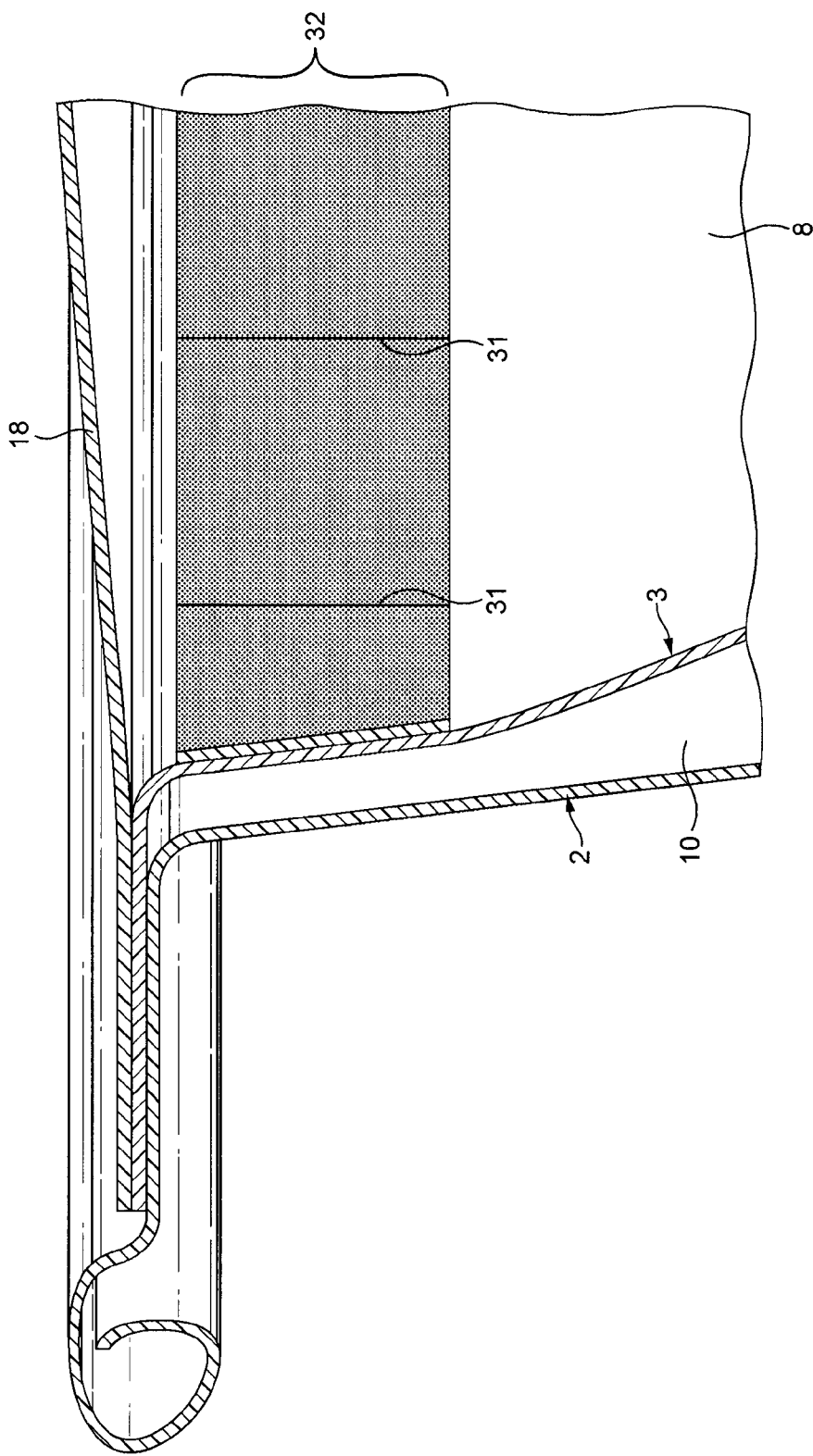
FIG. 10 is a detailed view of the capsule of FIGS. 1 and 2 according to a second variant.
Figure 11:
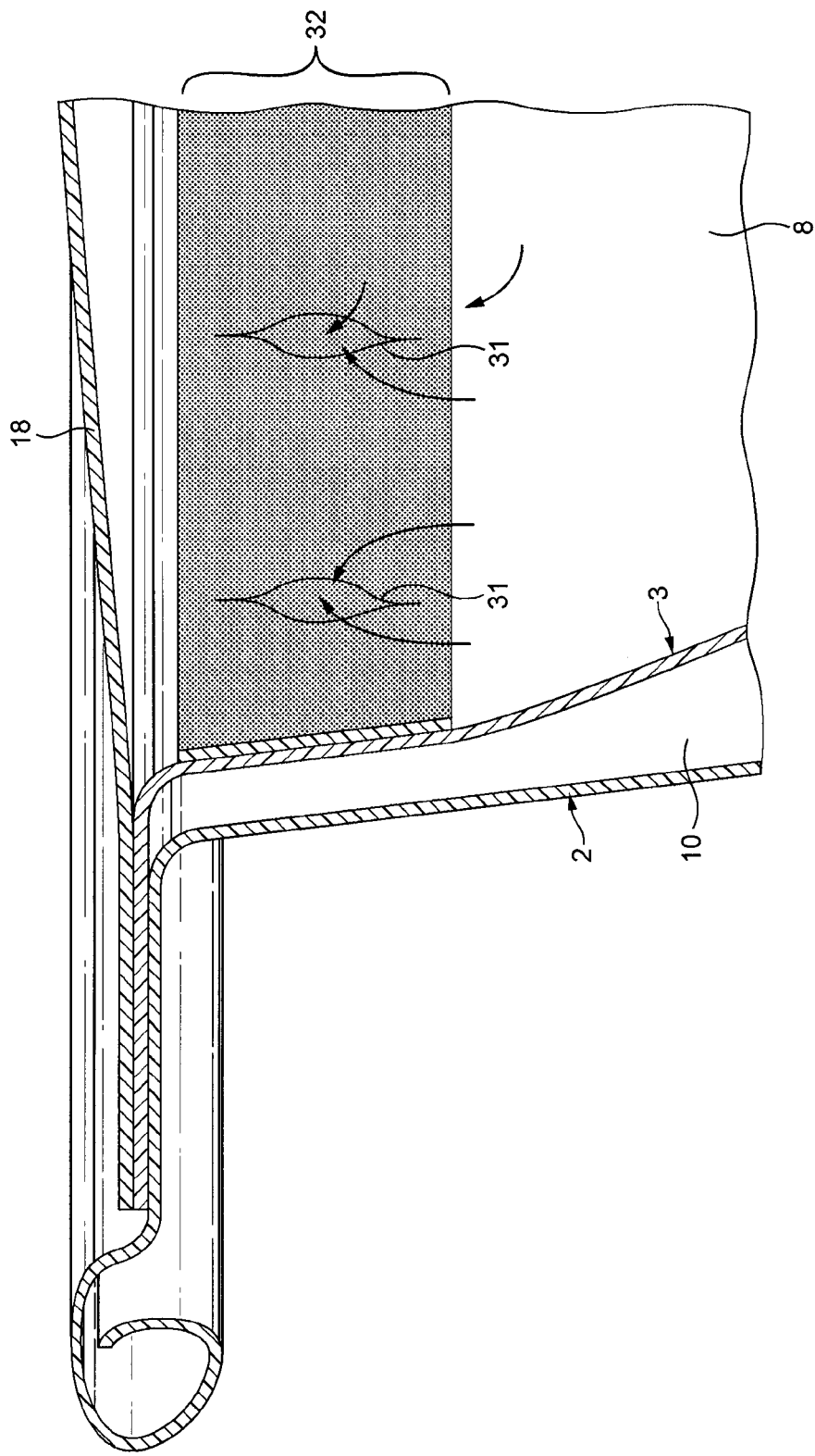
FIG. 11 shows the capsule of the variant of FIG. 10 during the extraction of the beverage by centrifugation.

FIG. 10 illustrates another mode of the capsule of the invention in which the outlet precursors 11 are formed by expandable precut areas 31. As a non limited example, the precut area are formed by a series of revolutionarily distributed slits provided through the inner wall in the peripheral portion. The inner wall may be formed of a relatively deformable material, such as plastic, rubber, textile, paper and any combinations thereof, to enable the slit to open under the effect of the centrifuged liquid. In particular, non-limiting embodiments, a filter material 32 such as a filter band is placed on the inner wall for covering the slits. FIG. 10 shows the expansion of the slits 31 by effect of the pressure of liquid. As a result, the filter material prevents the beverage ingredients from leaving the cavity 8 when the slits expand under the effect of the centrifugal pressure.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

The invention claimed is:

1. A capsule for the preparation of a beverage by centrifugation in a beverage preparation device, the capsule comprising:
   a generally concave outer wall and a generally concave inner wall, each wall having a peripheral portion extending substantially revolutionary around a central axis and a bottom portion;
   a lid extending transversally to said central axis and covering said outer and inner walls and forming with said inner wall an inner cavity containing beverage ingredients,
   an outer cavity positioned between the inner and outer walls;
   wherein beverage outlets or outlet precursors are positioned exclusively on the peripheral portion of the inner wall at or in the vicinity of a largest radius thereof to enable the beverage to be displaced from the inner cavity to the outer cavity through the beverage outlets or outlet precursors under the effect of centrifugal pressure, said outer cavity thereby collecting the beverage coming from the inner cavity, and wherein a remainder of the inner wall that does not form the peripheral portion thereof is free of beverage outlets or outlet precursors.

2. The capsule of claim 1, wherein the bottom portion of the outer wall comprises a beverage outlet enabling the beverage to leave the capsule.

3. The capsule of claim 2, wherein the beverage outlet in the bottom portion of the outer wall is aligned with the central axis.

4. The capsule of claim 2, wherein the beverage outlet of the outer wall has a larger transversal dimension of less than 5 mm.

5. The capsule of claim 2, wherein the beverage outlets or outlet precursors of the inner wall are positioned closer to the lid than to the beverage outlet of the outer wall.

6. The capsule of claim 1, wherein the beverage outlets or outlet precursors of the inner wall are formed of openings evenly and revolutionarily distributed on the inner wall around the central axis.

7. The capsule of claim 1, wherein the beverage outlets or outlet precursors of the inner wall are formed by premade openings covered by a tearable membrane.

8. The capsule of claim 6, wherein each opening has a diameter or a smaller cross-sectional dimension lower than 500 microns.

9. The capsule of claim 6, wherein the openings are circular or form elongated slots.

10. The capsule of claim 1, wherein the beverage outlets or outlet precursors of the inner wall are formed of a plurality pre-weakened or precut areas.

11. The capsule of claim 10, wherein the pre-weakened or precut areas are evenly and revolutionarily distributed on the inner wall around the central axis.

12. The capsule of claim 1, further comprising a peripheral flange for enabling the capsule to be firmly held by a rotating assembly of the beverage preparation device when driven in rotation around its central axis.

13. The capsule of claim 12, wherein the flange is formed by, at least, an outwardly extending edge of the outer wall.

14. The capsule of claim 13, wherein the inner wall is sealed onto the outwardly extending edge of the outer wall.

15. The capsule of claim 1, wherein the lid is formed by a perforable liquid-tight membrane.

16. The capsule of claim 1, wherein the bottom portion of the inner wall is generally concave.

17. The capsule of claim 1, wherein the bottom portion of the outer wall is generally concave.

* * * * *

UNITED STATES PATENT AND TRADEMARK OFFICE
CERTIFICATE OF CORRECTION

| | | |
|---|---|---|
| PATENT NO. | : 9,248,956 B2 | |
| APPLICATION NO. | : 14/394710 | |
| DATED | : February 2, 2016 | |
| INVENTOR(S) | : Alexandre Perentes and Alfred Yoakim | |

It is certified that error appears in the above-identified patent and that said Letters Patent is hereby corrected as shown below:

In the Specification:
Column 3, line 34: After "precursors are" delete "preferably".

Signed and Sealed this
Twenty-sixth Day of April, 2016

Michelle K. Lee
*Director of the United States Patent and Trademark Office*